United States Patent [19]

McKee et al.

[11] Patent Number: 5,445,252
[45] Date of Patent: Aug. 29, 1995

[54] CHARGE CORD AND RETRACTION SYSTEM FOR ELECTRIC VEHICLE

[75] Inventors: Thomas S. McKee, Dublin, Ohio; Takeshi Sakurai, Tochigi, Japan

[73] Assignee: Honda Giken Kogyo Kabushiki Kaisha, Tokyo, Japan

[21] Appl. No.: 279,896

[22] Filed: Jul. 25, 1994

[51] Int. Cl.⁶ .................................. H02G 11/02
[52] U.S. Cl. .................... 191/12 R; 191/12.2 R; 191/12 C
[58] Field of Search .............. 191/4, 12 R, 12.2 R, 191/12.4, 12.2 A, 12 C; 242/615, 615.1, 157 R

[56] References Cited

U.S. PATENT DOCUMENTS

| | | | |
|---|---|---|---|
| 2,262,587 | 11/1941 | Kaempf | 191/12.2 R |
| 2,975,807 | 3/1961 | Waninger | 191/12 C X |
| 3,053,358 | 9/1962 | Gross | 191/12 C |
| 3,330,105 | 7/1967 | Weber | 191/12 C X |
| 4,423,852 | 1/1984 | Conroy et al. | 191/12 R X |
| 4,828,225 | 5/1989 | Owen et al. | 191/12 R X |
| 4,853,500 | 8/1989 | Tydlacka | 191/12 R |
| 4,904,205 | 2/1990 | Rice | 191/12.4 X |

FOREIGN PATENT DOCUMENTS

| | | | |
|---|---|---|---|
| 0124457 | 11/1984 | European Pat. Off. | 191/12 R |
| 2664441 | 1/1992 | France | 191/12 R |
| 3431531 | 5/1986 | Germany | 191/12 C |

*Primary Examiner*—Robert J. Oberleitner
*Assistant Examiner*—Scott L. Lowe

[57] ABSTRACT

A charging cord for supplying electric current to an electric power storing device of an electric vehicle includes an electrical cable having a first end and a second end, the first end being operatively connected to the electric power storing device and the second end being adapted to be connected to an electrical power supply. A housing is provided for supporting the electrical cable along a predetermined length thereof. The housing includes a plurality of section members pivotally connected relative to each other for permitting limited lateral motion in a single plane to maintain the charging cord a predetermined distance above the ground surface.

19 Claims, 6 Drawing Sheets

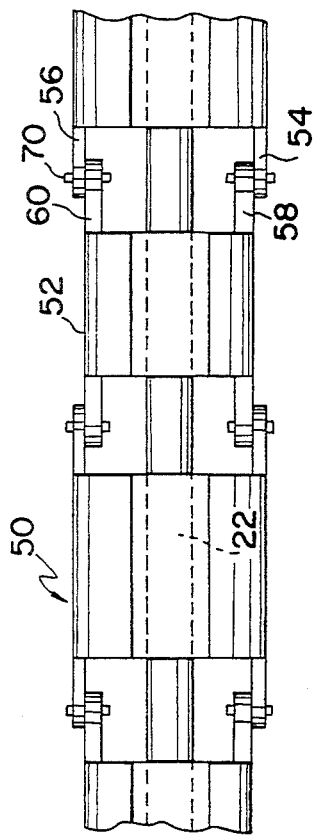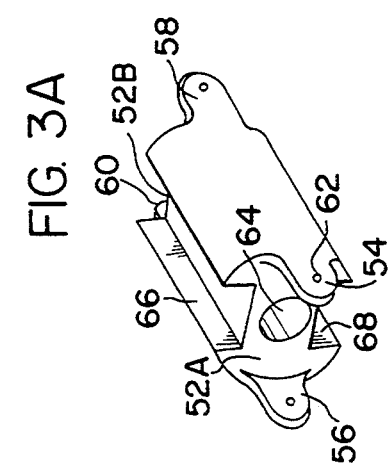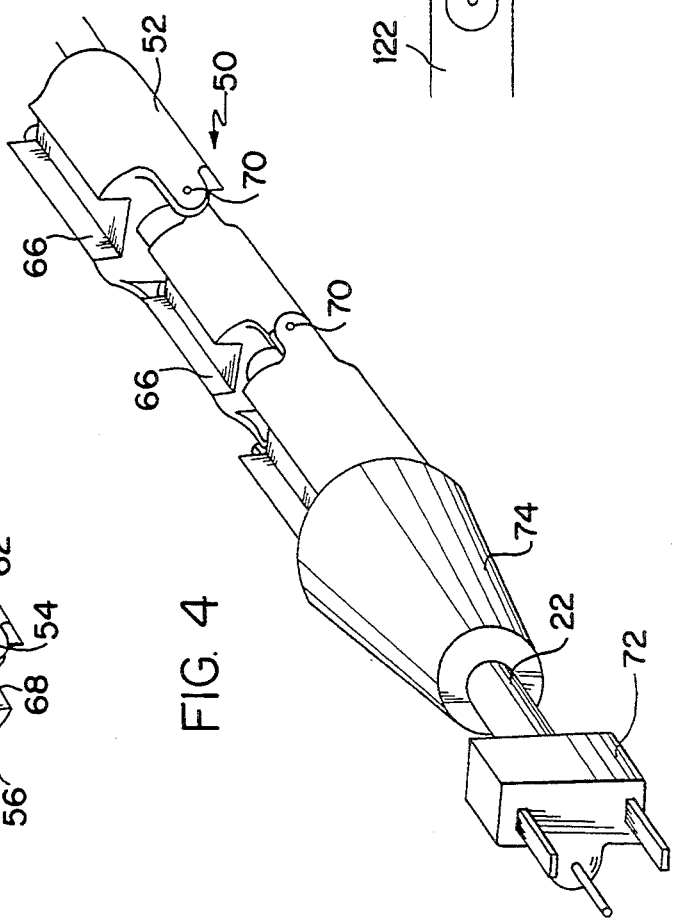

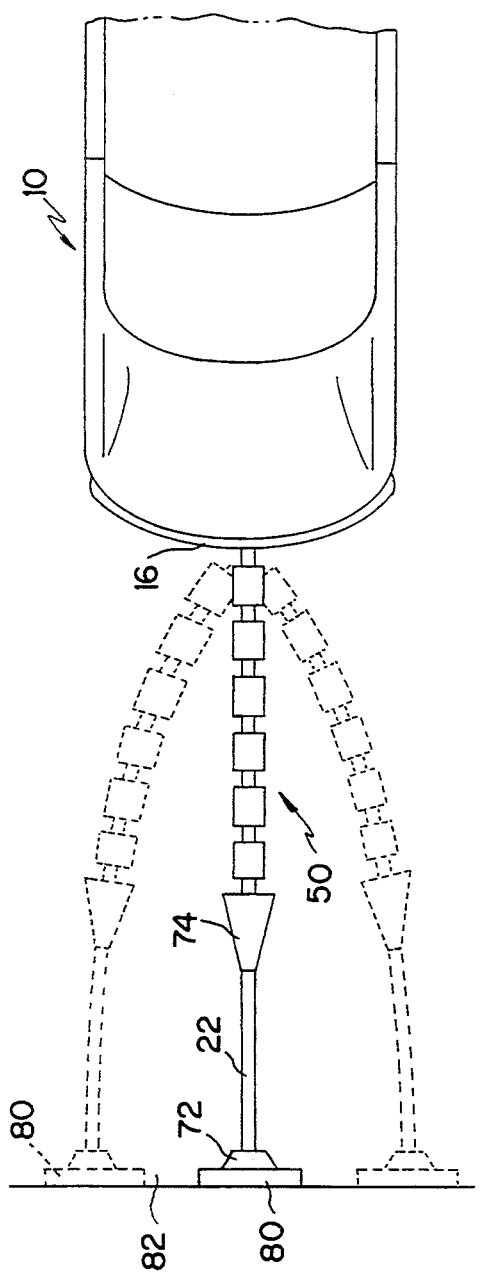
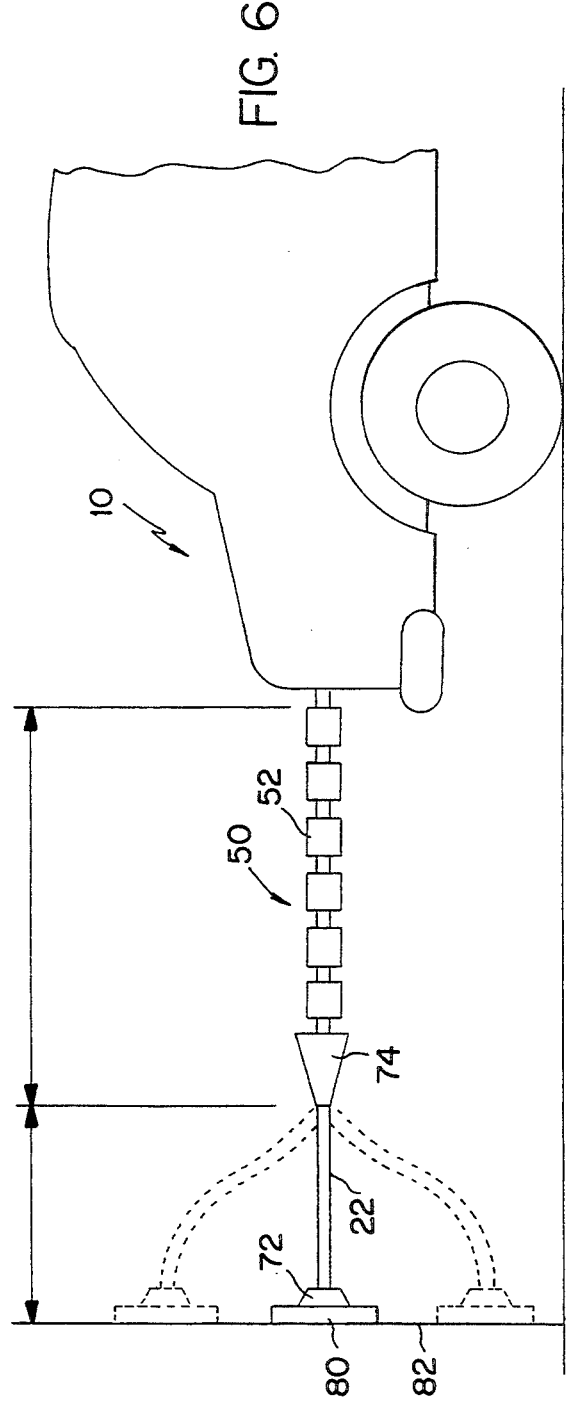

1

CHARGE CORD AND RETRACTION SYSTEM FOR ELECTRIC VEHICLE

BACKGROUND OF THE INVENTION

1. Field of the Invention

The present invention is directed to a charging cord for supplying electric current to an electric power storing device. A housing is provided for supporting an electrical cable along a predetermined length thereof to ensure that the electrical cable does not drop and touch the ground.

2. Description of Background Art

Hithertofore, electrical cables have been available for providing a connection between a source of electricity and an electric power storing device contained within the vehicle. The electrical cable is a flexible cable which normally engages the ground surface disposed between the vehicle and the source of the electrical supply. With use, the electrical cable becomes soiled and difficult to handle. The individual using the cable normally becomes dirty when utilizing the cable for recharging the vehicle. Further, the cable is somewhat heavy and is difficult for a handicapped individual to utilize.

SUMMARY AND OBJECTS OF THE INVENTION

It is an object of the present invention to provide a charging cord for supplying electric current to an electric power storing device wherein the charging cord may be withdrawn from a vehicle and supported to extend above the ground surface to facilitate the use of the charging cord during recharging of the electric power storing device.

A further object of the present invention is to provide a charging cord for supplying electric current to an electric power storing device wherein the charging cord is able to be displaced a predetermined lateral distance in one plane relative to the vehicle to align the charging cord with the source of electric current.

A further object of the present invention is to provide an electric charging cord for supplying electric current to an electric power storing device wherein the charging cord is contained within a storage chamber for conveniently recoiling the charging cord during non-use.

A still further object of the present invention is to provide a charging cord which is universally adaptable for all power supply locations and ratings.

These and other objects of the present invention are achieved by providing a charging cord for supplying electric current to an electric power storing device of an electric vehicle wherein an electrical cable includes a first end and a second end. The first end is operatively connected to the electric power storing device. The second end is adapted to be connected to an electric power supply. A housing is provided for supporting the electrical cable along a predetermined length thereof. The housing includes a plurality of sections pivotally connected relative to each other for permitting limited lateral movement in one plane.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 3A is a perspective view of a section member of the housing;

FIG. 3B is a side elevational view of a plurality of section members pivotally connected relative to each other;

FIG. 4 is a perspective view illustrating a charge cord grip handle and a plug for securing the charging cord to a source of electricity;

FIG. 5 is a top plan view illustrating the charging cord extending from the electric vehicle for selectively being connected to one of a number of laterally displaced electrical supplies;

FIG. 6 is a side elevational view illustrating the charging cord according to the present invention which may extend a predetermined distance from the vehicle and be connected to a source of electric supply at a variety of different elevations;

FIG. 8 is a side elevational view of a second embodiment of sections of the housing according to the present invention;

DETAILED DESCRIPTION OF THE PREFERRED EMBODIMENTS

Figure 1:
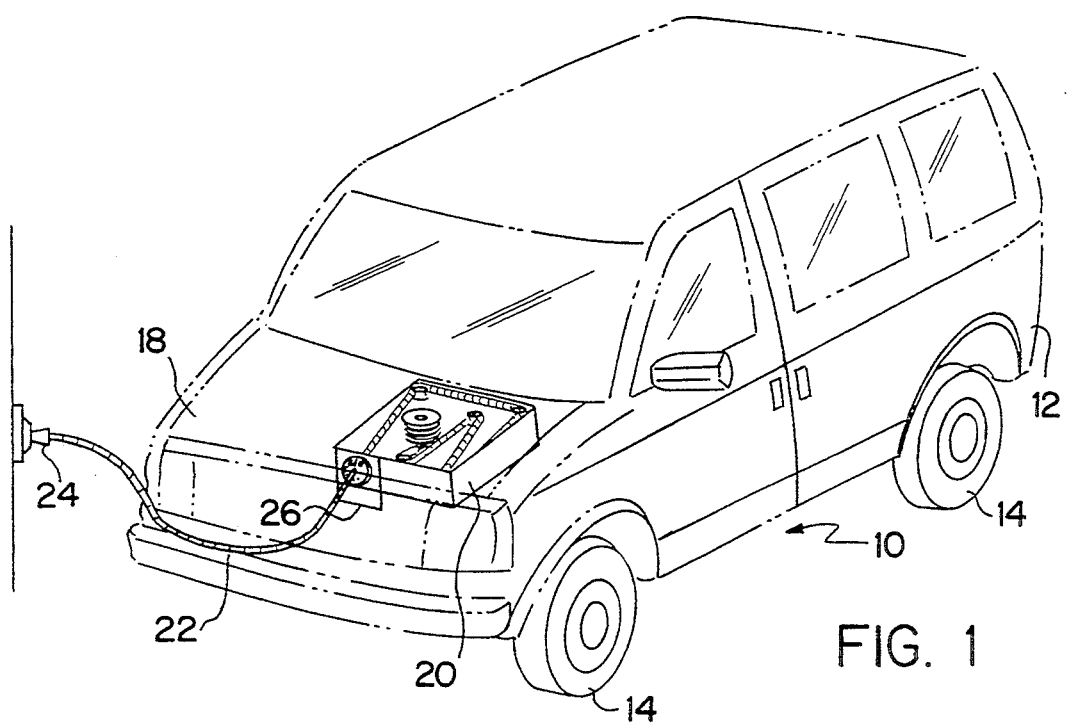
FIG. 1 is a perspective view illustrating an electric vehicle with a charging cord extending to a source of electric power.

FIG. 1 is perspective view illustrating an electric vehicle 10 which includes a body 12 and ground engaging wheels 14. The vehicle 10 includes a front portion 16 having a hood 18. Beneath the hood 18 is a storage chamber 20 for positioning an elongated electrical cable 22. The electrical cable or charging cord 22 includes a plug 24 disposed at one end thereof. A door 26 is mounted adjacent to the front portion 16 of the electric vehicle 10. The door 26 may be opened to permit an individual to grasp, the plug 24 and extend the elongated electrical cable or charging cord 22 outwardly from the vehicle.

Figure 2:
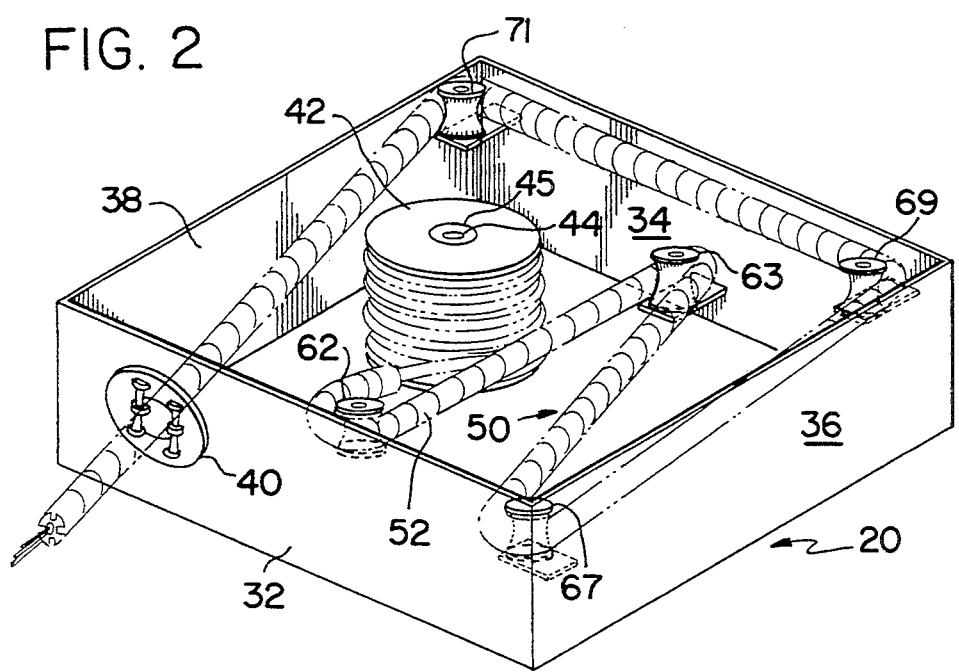
FIG. 2 is a perspective schematic view illustrating the charging cord according to the present invention in a recoiled position within a storage chamber.

As illustrated in FIG. 2, the storage chamber 20 includes a front wall 32, a rear wall 34, a right side wall 36 and a left side wall 38. A rotating ring 40 is mounted on the front wall 32. The rotating ring 40 permits an individual to change the orientation of the electrical cable 22 as it extends outwardly from the storage chamber 20.

Disposed within the storage chamber 20 is a reel 42 mounted for rotation about an axis 44. The reel 42 includes the elongated cable 22 mounted therearound. A housing 50 is mounted to extend around a predetermined length of the electrical cable 22. The housing 50 includes a plurality of sections 52 which are pivotally mounted relative to each other. The housing 50 is a flexible housing that limits flexing of the elongated cable 22 to substantially one plane. A retraction system 45 may be provided on the reel 42 for assisting in the retraction of the electrical cable or charging cord 22. In this embodiment, the electrical cable or charging cord 22 would not require pushing by a user in order to retract the electrical cable or charging cord 22 within the storage chamber 20. In addition, the storage chamber 20 may be located adjacent to the front portion of a vehicle 10 or may be disposed in the trunk portion thereof.

As illustrated in FIG. 2, the elongated cable 22 is normally wound around the reel 42. The plurality of sections 52 extend from a first roller 62 mounted on the bottom wall, to a second roller 63 mounted on the rear wall 34. Thereafter, the sections 52 extend around the second roller 63 to a third roller 67 mounted on the right side wall 36. The plurality of sections 52 then extend rearwardly to a fourth roller 69 mounted on the rear wall 34. Thereafter, the sections 52 extend along the rear wall 34 to a fifth roller 71 mounted thereon. Finally, the sections 52 extend through the rotating ring 40 to be guided thereby as they are advanced manually from the storage chamber 20 by a user.

As illustrated in FIGS. 3A, 3B and 4, the section member 52 includes yokes 54 and 56 which project outwardly from a front surface 52A thereof. In addition, yokes 58 and 60 project outwardly from a rear surface 52B. Each yoke includes an aperture 62 disposed therein for receiving a pin. A central aperture 64 extends along the length of the section member 52. A first longitudinal recess 66 is disposed on an upper surface of the section 52. A second longitudinal recess 68 is disposed along the length of a lower portion of the section member 52. The longitudinal recesses 66, 68 prevent twisting of the electrical cable or charging cord 22 as it is extracted and retracted.

FIG. 3B is a side elevational view illustrating the electrical cable 22 disposed within the aperture 64 in the section members 52. A plurality of pins 70 are disposed within the apertures 62 in the various yoke members 54, 56, 58 and 60. The pins 70 permit the plurality of section members 52 to pivot in a direction perpendicular to the plane of the side elevational view illustrated in FIG. 3B. The pins 70 and the yokes of each section member 52 are oriented in the same direction so that the housing 50 flexes in only one plane. The tolerances of the pins and the yoke apertures permit only slight flexibility of the housing in a direction perpendicular to the flex plane. The flexibility of the flexible housing 50 allows the charging cord to be connected to a power outlet that is not in direct alignment with the charging cord opening in the vehicle.

The flexible housing 50 may be constructed from a plastic resin, e.g. ABS resin, impregnated with a lubricating material, e.g. PTFE or powdered metals.

The housing 50 which includes the plurality of section members 52 will permit the cable 22 to move laterally in one plane about the pivot pins 70. However, an up and down movement of the housing 50 is restricted in view of the fact that the pins 70 only permit rotational movement in one plane and permit only limited upward or downward movement.

As illustrated in FIG. 4, a plurality of section members 52 are pivotally connected together at pivot pins 70. The recess 66 is disposed along the upper portion of the section members 52. The electrical cable 22 extends through the section members 52 and includes a plug 72. The electrical cable 22 may be provided with a plurality of plugs so that the electrical cable is universally adapted for all power supply voltages. This enables a single electrical cable to be used regardless of the power supply voltage. A grip handle 74 is disposed at the outer end of the housing 50 to permit an individual to actually grasp the electrical cable 22 and housing member 50 and advance the electrical cable 22 and housing member 50 outwardly from the storage chamber 20.

FIG. 5 is a top plain view illustrating an electrical vehicle 10 with the electrical cable 22 projecting from the front portion 16. The housing 50 permits the cable to extend outwardly from the vehicle 10. The grip handle 74 permits an individual to grasp the electrical cable 22 and the housing 50 to extend the electrical cable 22 and the housing 50 from the storage chamber disposed within the vehicle. The plug 72 is adapted to be affixed to an electrical outlet 80. As the vehicle approaches a wall 82 containing the electrical outlet 80 disposed therein, the electrical cable 22 may be plugged directly into the electrical outlet 80. However, occasionally, the electrical outlet 80 will be displaced relative to the electrical cable 22 which will require the electrical cable to be moved laterally relative to the vehicle 10. The housing 50 of the present invention permits the lateral movement of the electrical cable 22 relative to the vehicle 10 to permit an individual to insert the plug 72 into an electrical outlet 80.

FIG. 6 illustrates a side elevational view of the charging cord of the present invention which includes the housing 50 and the electrical cable 22. As illustrated in FIG. 6, the housing 50 which includes a plurality of sections 52 will maintain the electrical cable 22 and the grip handle 74 above the ground surface. In this way, the electrical cable 22 will not become soiled. By maintaining the electrical cable 22 and the housing 50 above the ground surface, the electrical cable is very easy to handle by an individual seven if the individual is handicapped. By grasping the grip handle 74 the housing 50 and the electrical cable 22 may be extended from the vehicle 10. The plug 72 may be inserted into an electrical outlet on the wall surface 82. Again, if the electrical outlet 80 is at a higher or a lower elevation relative to the housing 50, the electrical cable 22 may be extended from the grip handle 74 and inserted into the electrical outlet 80 at a higher or a lower elevation.

Figure 7:
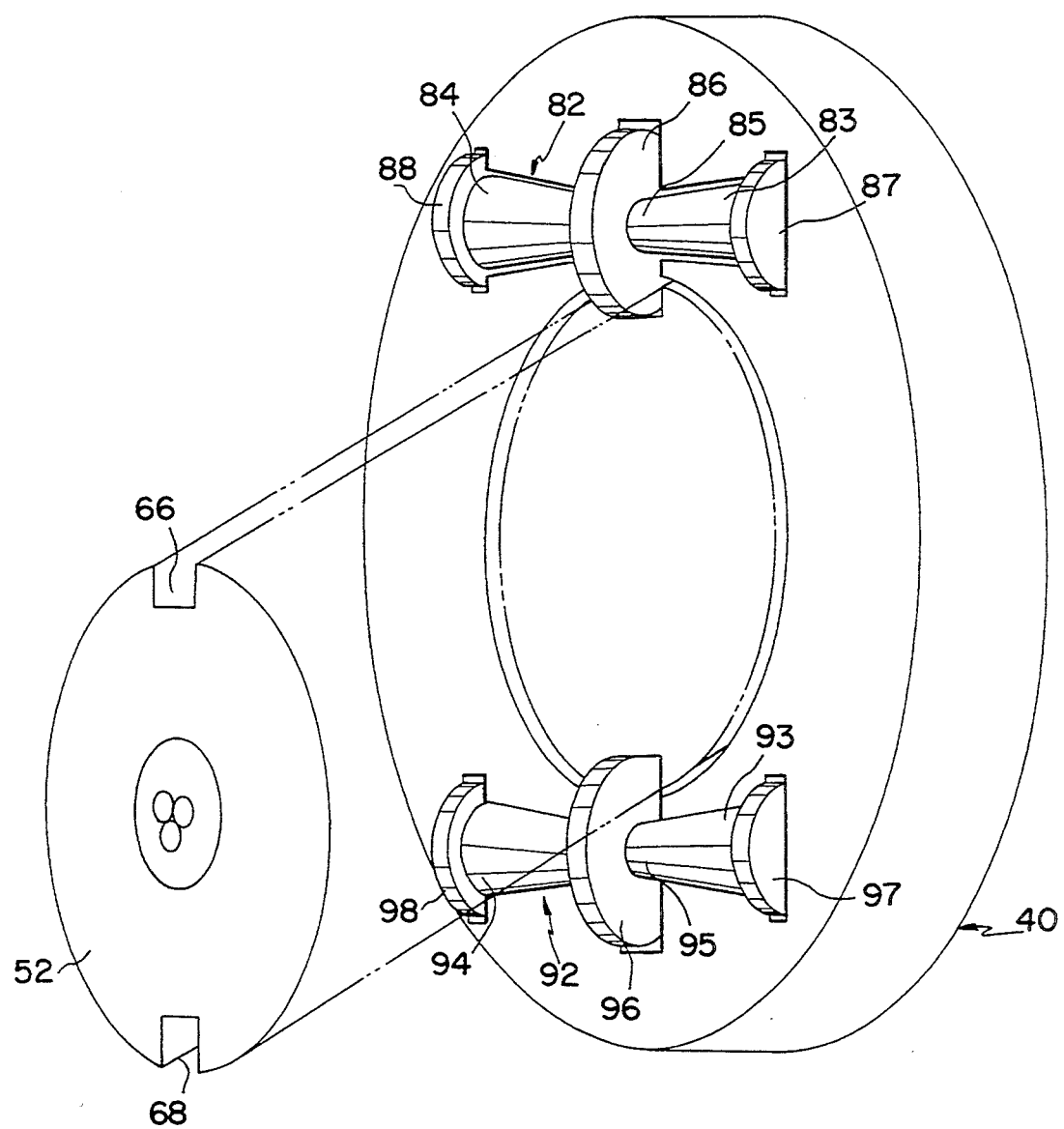
FIG. 7 is an enlarged perspective view of a rotating ring for adjusting the orientation of the housing as it extends either from or within the storage container.

FIG. 7 is an enlarged perspective view of a rotating ring 40 for affixing to the front wall 32 of the storage chamber 20. The rotating ring 40 includes a first roller 82 having enlarged end sections 83, 84 with a reduced diameter central portion 85. Similarly, a second roller 92 includes enlarged diameter end sections 93, 94 with a reduced diameter central portion 95. A guide roller 86 is secured to the central portion 85 of the first roller 82. Similarly, a guide roller 96 is secured to the central portion 95 of the second roller 92. The guide roller 86 is designed to be engaged within the recess 66 disposed in the upper surface of the section member 52. The guide roller 96 is designed to be disposed within the recess 68 disposed along the lower portion of the section member 52. Bearings 87, 88 are operatively connected relative to the enlarged diameter end sections 83, 84, respectively, of the first roller 82. Similarly, bearings 97, 98 are operatively secured to the enlarged diameter sections 93, 94 of the second roller 92.

FIG. 8 is a side elevational view of a second embodiment of the section members 52' of the housing 50' according to the present invention. As illustrated in FIG. 8, a first section 152 has a predetermined diameter. A second section 252 has a reduced diameter relative to the first section 152. A yoke 154 is operatively connected to a yoke 158 by means of a pin 170. The operation of the housing 50', as illustrated in FIG. 8, is the same as the operation of the housing illustrated in FIGS. 3B and 4. In other words, the section 152 may rotate relative to the section 252 about the pivot pin 170. However, the movement permitted is only in a predetermined lateral direction. The electrical cable 122 disposed within the section members 152 and 252 can substantially only be moved in one plane.

Figure 9:
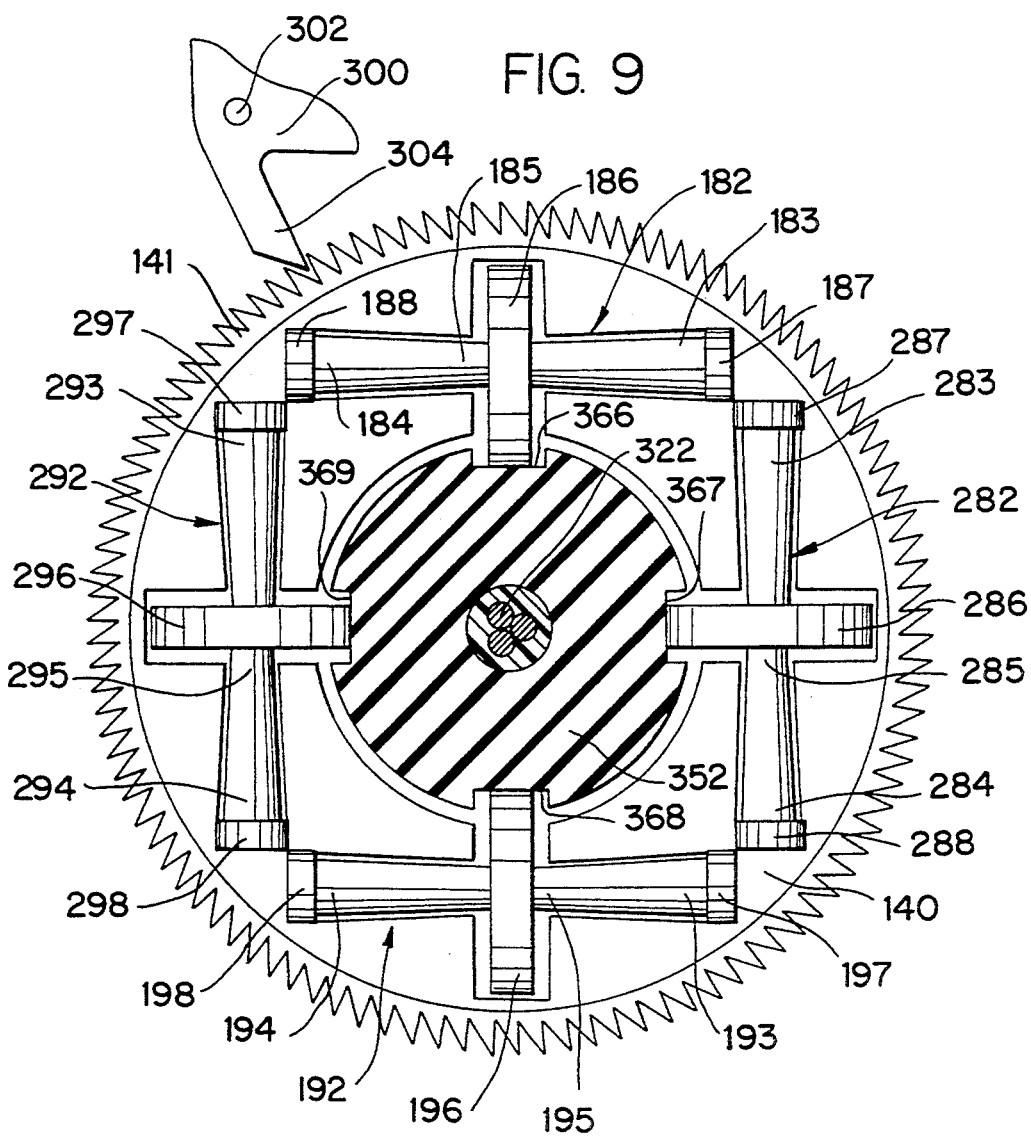
FIG. 9 is an elevational view illustrating an embodiment of a rotating ring according to the present invention.

FIG. 9 is an elevational view illustrating a second embodiment of a rotating ring 140 according to the present invention. The rotating ring 140 includes a first roller 182 having an enlarged diameter end sections 183 and 184. A reduced diameter central portion 185 is provided. A guide roller 186 is mounted on the reduced diameter central portion 185. Bearings 187, 188 are operatively connected to the enlarged end sections 183 and 184. A second roller 192 includes enlarged diameter end sections 193 and 194. A reduced diameter central portion 195 is provided. A guide roller 196 is operatively connected to the reduced central portion 195. Bearings 197 and 198 are operatively connected to the enlarged diameter end portions 193 and 194.

In addition, as illustrated in FIG. 9, a third roller 282 is provided having an enlarged diameter end sections 283, 284. A reduced diameter central portion 285 is provided. A guide roller 286 is operatively mounted relative to the reduced diameter central portion 285. Bearings 287, 288 are operatively connected to the enlarged diameter end sections 283 and 284, respectively.

Finally, a fourth roller 292 is provided with enlarged diameter end sections 293 and 294. A reduced diameter central portion 295 is provided with a guide roller 296 operatively connected thereto. Bearings 297 and 298 are operatively connected to the enlarged diameter end sections 293 and 294, respectively.

The section member 352 includes a recess 366 disposed along the upper surface thereof. In addition, a recess 368 is provided which extends along the lower portion thereof. Further, longitudinal recesses 367 and 369 are provided which extend along the length of the section member 352. An electrical cable 322 is operatively provided within an aperture in the central portion of the section member 352.

A ratchet member 300 is pivoted about the pivot point 302. The ratchet 300 includes an engaging paw 304 for engaging the teeth 141 disposed around the outer peripheral surface of the rotating ring 140. In this way, the rotating ring 140 may be rotated so as to orient the section members 352 relative to an electrical plug into which the electrical cable 322 will be inserted. Once the proper orientation of the section members 352 has been determined by the rotating ring 140 relative to the storage chamber, the ratchet 300 will secure the rotating ring 140 relative to the storage chamber so that the proper orientation of the section members 352 is maintained.

Figure 10:
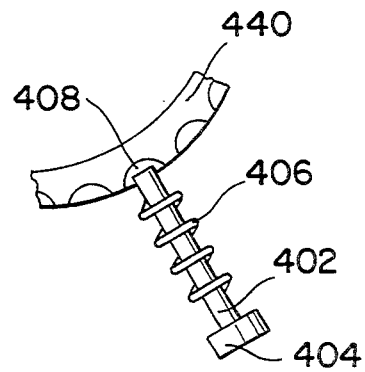
FIG. 10 is a partial schematic view illustrating another embodiment of a stop mechanism according to the present invention.

FIG. 10 is a partial schematic view illustrating another embodiment of a stop mechanism according to the present invention. A pin 402 is provided with a head portion 404. A spring 406 is operatively mounted to surround the pin 402. Recesses 408 are disposed in the outer peripheral surface of the rotating ring 440. After a user has rotated the rotating ring 440 to the correct orientation, the pin 402 may be released so that the spring 406 will hold the pin 402 in engagement with a recess 408 for accurately positioning the rotating ring 440. The head portion 404 may be used to permit an individual to firmly grasp the pin 402.

Figure 11:
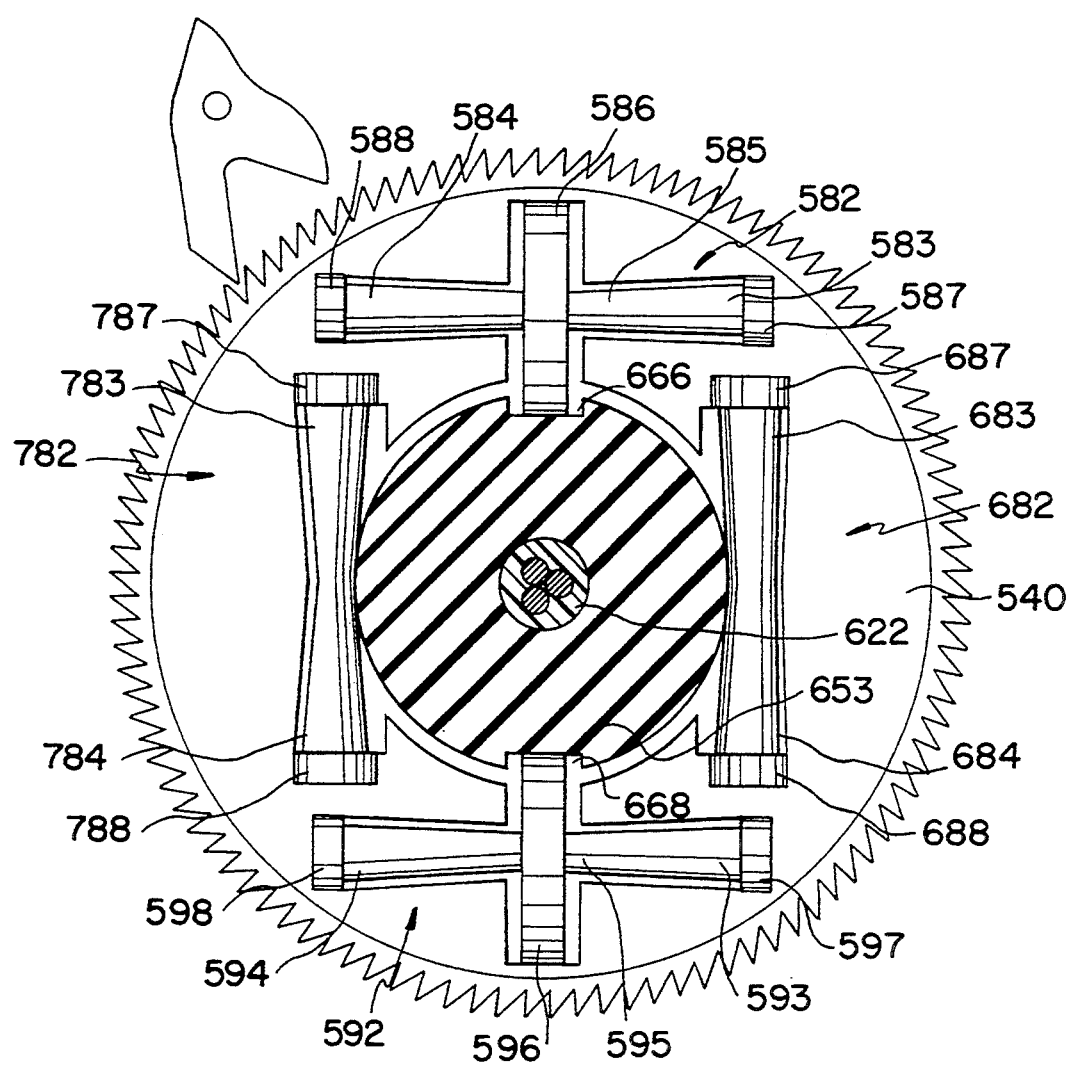
FIG. 11 is an elevational view illustrating a second embodiment of a rotating ring according to the present invention.

FIG. 11 is an elevational view illustrating another embodiment of a rotating ring 540 according to the present invention. The rotating ring includes a first roller 582. The first roller 582 includes enlarged end portions 583, 584. A reduced diameter central section 585 is provided having a guide ring 586 mounted thereon. A second roller 592 is provided having enlarged end sections 593, 594. A reduced diameter center portion 595 is provided with a guide ring 596.

Bearings 587 and 588 are mounted on the enlarged diameter end sections 583 and 584, respectively. Similarly, bearings 597 and 598 are operatively mounted on the enlarged diameter sections 593 and 594.

As illustrated in FIG. 11, a third roller 682 is secured on the right side of the section members 653. The roller 682 includes enlarged diameter end sections 683, 684. Bearings 687 and 688 are operatively mounted on the enlarged diameter end sections 683 and 684. In addition, a fourth roller 782 is mounted within the rotating ring 540. The fourth roller 782 includes enlarged diameter end sections 783 and 784. Bearings 787 and 788 are operatively mounted adjacent to the enlarged diameter end sections 783 and 784. The section member 653 includes an aperture for containing the cable 622 therein. A recess 666 is disposed along the upper surface of the section member 653. The guide roller 586 is mounted to be disposed within the longitudinal recess 666. Similarly, a longitudinal recess 668 is disposed along the lower portion of the section member 653. The guide roller 596 is designed to be received within the recess 668.

In the embodiment illustrated in FIG. 11, the section member 653 is guided by means of the guide rollers 586 and 596 to be disposed in a predetermined orientation as the rotating ring 540 is oriented relative to the storage chamber. The third guide roller 682 and the fourth guide roller 782 are designed to engage the outer peripheral surface of the section member 653 to assist with the insertion of the section member 653 and the cable 622 as it is disposed within the storage chamber or removed from the storage chamber.

The present invention provides a charging cord that is simple and convenient to use and easily stored within the electric vehicle. The charging cord is designed to be elevated relative to the ground surface to prevent soiling of the charging cord. The charging cord is universally adaptable to all power supply locations and ratings.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A charging cord for supplying electric current to an electric power storing device of an electric vehicle comprising:

an electrical cable having a first end and a second end, said first end being operatively connected to said electric power storing device and said second end being adapted to be connected to an electrical power supply; and a housing for supporting said electrical cable along a predetermined length thereof, said housing includes a plurality of section members pivotally connected relative to each other for permitting limited lateral motion in a single plane to maintain the charging cord a predetermined distance above the ground surface and said housing being adapted to allow said electrical cable to be withdrawn therefrom during use.

2. The charging cord for supplying electric current to an electric power storing device according to claim 1, wherein a majority of said plurality of sections each include a yoke at each end thereof and at least one pin at each end thereof, said yoke and at least one pin being operatively connected together for permitting limited pivotal motion relative to each other in a single plane in a lateral direction.

3. The charging cord for supplying electric current to an electric power storing device according to claim 1, and further including a grip handle connected to said second end of said electrical cable for assisting a user in withdrawing the electrical cable during use.

4. The charging cord for supplying electric current to an electric power storing device according to claim 1, and further including a storage chamber for containing said electrical cable in a recoiled condition during non-use.

5. The charging cord for supplying electric current to an electric power storing device according to claim 4, wherein said storage chamber includes a reel for coiling a predetermined length of the electrical cable and a plurality of rollers disposed within said storage chamber for engaging said housing for supporting said electrical cable for maintaining the length of said housing in a stored condition during non-use.

6. The charging cord for supplying electric current to an electric power storing device according to claim 5, and further including recoiling means operatively connected to said reel for rewinding said electrical cable during retraction.

7. The charging cord for supplying electric current to an electric power storing device according to claim 4, and further including a ring rotatably mounted relative to said storage chamber and engaging said housing for supporting said electrical cable, said ring permits manual adjustment of said housing for supporting said electrical cable in a predetermined orientation relative to said storage chamber during use.

8. The charging cord for supplying electric current to an electric power storing device according to claim 7, wherein said ring includes a plurality of rollers for engaging said housing for supporting said electrical cable in said predetermined orientation relative to said storage chamber.

9. The charging cord for supplying electric current to an electric power storing device according to claim 8, wherein said housing for supporting said electrical cable includes at least one longitudinal recess disposed along the length thereof and said plurality of rollers includes at least one roller guide mounted on one of said rollers, said roller guide being operatively positioned within said longitudinal recess of said housing for supporting said electrical cable in a predetermined orientation relative to said storage chamber.

10. A charging cord for supplying electric current to an electric power storing device according to claim 9, wherein said housing for supporting said electrical cable includes at least two longitudinal recesses disposed along the length thereof and said plurality of rollers includes at least one roller guide mounted on two of said rollers, said roller guides being operatively positioned within preselected longitudinal recesses of said housing for supporting said electrical cable in a predetermined orientation relative to said storage chamber.

11. A charging cord for supplying electric current to an electric power storing device of an electric vehicle comprising:

an electrical cable having a first end and a second end, said first end being operatively connected to said electric power storing device and said second end being adapted to be connected to an electrical power supply;

a storage chamber for containing said electrical cable in a recoiled condition during non-use; and a housing for supporting said electrical cable along a predetermined length thereof, said housing includes a plurality of section members pivotally connected relative to each other for permitting limited lateral motion in a single plane to maintain the charging cord a predetermined distance above the ground surface.

12. The charging cord for supplying electric current to an electric power storing device according to claim 11, wherein a majority of said plurality of sections each include a yoke at each end thereof and at least one pin at each end thereof, said yoke and at least one pin being operatively connected together for permitting limited pivotal motion relative to each other in a single plane in a lateral direction.

13. The charging cord for supplying electric current to an electric power storing device according to claim 11, and further including a grip handle connected to said second end of said electrical cable for assisting a user in withdrawing the charging cord during use.

14. The charging cord for supplying electric current to an electric power storing device according to claim 11, wherein said storage chamber includes a reel for coiling a predetermined length of the electrical cable and a plurality of rollers disposed within said storage chamber for engaging and guiding said housing for supporting said electrical cable for maintaining the length of said housing in a stored condition during non-use.

15. The charging cord for supplying electric current to an electric power storing device according to claim 14, and further including recoiling means operatively connected to said reel for rewinding said charging cord during retraction.

16. The charging cord for supplying electric current to an electric power storing device according to claim 11, and further including a ring rotatably mounted relative to said storage chamber and engaging said housing for supporting said electrical cable, said ring permits manual adjustment of said housing for supporting said electrical cable in a predetermined orientation relative to said storage chamber during use.

17. The charging cord for supplying electric current to an electric power storing device according to claim 16, wherein said ring includes a plurality of rollers for engaging said housing for supporting said electrical cable in said predetermined orientation relative to said storage chamber.

18. The charging cord for supplying electric current to an electric power storing device according to claim 17, wherein said housing for supporting said electrical cable includes at least one longitudinal recess disposed along the length thereof and said plurality of rollers includes at least one roller guide mounted on one of said rollers, said roller guide being operatively positioned within said longitudinal recess of said housing for supporting said electrical cable in a predetermined orientation relative to said storage chamber.

19. A charging cord for supplying electric current to an electric power storing device according to claim 18, wherein said housing for supporting said electrical cable includes at least two longitudinal recesses disposed along the length thereof and said plurality of rollers includes at least one roller guide mounted on two of said rollers, said roller guides being operatively positioned within preselected longitudinal recesses of said housing for supporting said electrical cable in a predetermined orientation relative to said storage chamber.

* * * * *